(12) United States Patent
Bjureblad et al.

(10) Patent No.: US 6,543,086 B2
(45) Date of Patent: Apr. 8, 2003

(54) COLLAPSIBLE HOOD HINGE

(75) Inventors: Mats Bjureblad, Gothenburg (SE); Martin Weiman, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/683,116

(22) Filed: Nov. 20, 2001

(65) Prior Publication Data

US 2002/0026685 A1 Mar. 7, 2002

Related U.S. Application Data

(63) Continuation of application No. PCT/SE00/01032, filed on May 23, 2000.

(30) Foreign Application Priority Data

May 25, 1999 (SE) .................................................. 9901868

(51) Int. Cl.⁷ .............................................. B62D 25/12
(52) U.S. Cl. ...................... 16/222; 180/69.2; 180/274; 296/189
(58) Field of Search ............................ 16/222; 180/274, 180/69.2; 296/189

(56) References Cited

U.S. PATENT DOCUMENTS

| | | | | |
|---|---|---|---|---|
| 3,643,755 A | | 2/1972 | Gionet et al. | |
| 5,263,546 A | * | 11/1993 | Cady et al. | 16/222 |
| 5,385,212 A | * | 1/1995 | Cady et al. | 16/222 |
| 5,437,348 A | * | 8/1995 | Cady et al. | 16/222 |
| 5,557,829 A | * | 9/1996 | Schoen et al. | 16/375 |
| 5,697,467 A | * | 12/1997 | Howard | 16/222 |
| 6,269,521 B1 | * | 8/2001 | Gabel | 16/361 |
| 6,415,882 B1 | * | 7/2002 | Schuster et al. | 180/69.21 |

FOREIGN PATENT DOCUMENTS

DE   197 12961 A1   10/1998

* cited by examiner

Primary Examiner—Lynne H. Browne
Assistant Examiner—Doug Hutton
(74) Attorney, Agent, or Firm—Howrey Simon Arnold & White LLP

(57) ABSTRACT

A hinge arrangement for vehicle hoods in vehicles is described. The arrangement is intended to decrease injuries to pedestrians struck by the front of the vehicle. The hood is pivotable about at least two hinges, preferably applied at the rear of the hood. The hood is able to compliantly receive impacts in the vertical direction. Each respective hinge is fixed in at least two rods connected to the hinges. One of the rods is a draw rod, designed to receive forces in the longitudinal direction of the hood, substantially stopping horizontal displacement of the hood in a collision. Another rod is a vertical rod, able to deform due to a vertical collision at a predetermined vertical load. The vertical rod is shaped to be able to receive the vertical load over a predetermined deformation length.

7 Claims, 5 Drawing Sheets

COLLAPSIBLE HOOD HINGE

CROSS REFERENCE TO RELATED APPLICATIONS

The present application is a continuation of International Application No. PCT/SE00/01032, filed May 23, 2000 and published under PCT Article 21(2) in English, which claims priority to Swedish Application No. 9901868-1, filed May 25, 1999. Both application are expressly incorporated herein by reference.

BACKGROUND OF INVENTION

1. Technical Field

The present invention relates to a hinge arrangement for vehicles. More specifically, the invention relates to a hinge arrangement for passenger cars intended for decreasing injuries to pedestrians that are run into. The hood is hinged around two applied hinges at the rear end of the hood whereby the hood is compliantly arranged to pick up impacts in the vertical direction.

2. Background Information

A great number of the people being injured or killed in traffic are unprotected pedestrians that are run into by passenger cars. In a collision involving a pedestrian being struck by the front of a passenger car, often the pedestrian falls over the hood of the vehicle, with the pedestrian's head colliding with the hood vertically from above at a high kinetic energy. Adults tend to collide with their head against the hood mainly in the rear half of the hood, while children typically collide with their head against the front half.

It is known to design hoods compliantly in order to protect pedestrians. It is also known to attempt to increase the distance from the front of hood to its underlying hard components over different parts of the hood, i.e., obtaining a deformation length that is sufficient enough to brake the pedestrian's head before it hits hard components. An important problem in this context, which presently has not been solved satisfactorily, is how to fix both hood hinges for those hoods having hinges arranged at the rear end of the hood. The risk for an adult pedestrian being run into is comparatively great that he hits the head at or close to the rear hinges fixings. In conventional constructions, these are rigidly connected to the car body and therefore would cause contusions to a head falling heavily down on the hinge fixing.

In German Patent Application DE 19 71 2 961 A ("the "961 application"), a safety mounting for the front hood of a vehicle is described. According to this design, sensors are provided for detecting a collision with a pedestrian, thereby activating a compressed spring or releasing an explosive charge. The spring or explosive charge lifts the hood above the hinges, forming a compliant deformation length between the hood and the compact parts in front of the hinges. Understandably, by using a sensor and compression spring or explosive charge combination, this construction is particularly complicated.

Further, the "961 application mounting has several drawbacks. For example, there is the risk of the compression spring releasing or explosion charge occurring unintentionally, which may occur in a collision not involving a pedestrian. Also, when such a release unintentionally occurs, the effort to reset the device can be difficult and time demanding. There is also the risk that, in a collision, the rear mounted hood is displaced backwards into the windshield, risking injury to the driver and any passengers.

German Publication No. 27 11 339 ("the "339 publication") describes a device wherein the hood is lifted up above the rear fixings of the hood in connection with a collision that displaces the hood backwards. However, this publication does not describe a solution for hinges. Further, the hood must be displaced backwards in order to lift up the hood in the rear. In such a design, a pedestrian that is hit can be thrown head first into the hood at or near the fixings prior to the hood being displaced backwards. This can cause the pedestrian's head to hit the hard fixings directly. Also, like the "961 application, there is a major risk that the hood will hit into the windshield if displaced backwards.

Passenger car hoods are compliantly shaped to collision impacts from above. The hoods bend and curve differently at different locations in an attempt to create a sufficient deformation space between the hood and the underlying hard components. Should the hood be displaced in connection with a collision, there is no controlling the deformation spaces under the hood to ensure that they are sufficient.

In European Patent No. 0 644 104 B1, a similar solution to the "961 application and the "339 publication is described. Here, a lifting device is described that is arranged to lift the rear end of the hood when the hood is displaced backwards in a collision. Still, although the problem has been long recognized, no satisfactory solution has been provided.

SUMMARY OF INVENTION

The present invention provides a simple solution for the problem discussed above with a hinge arrangement for a vehicle that decreases the amount or degree of injury to a pedestrian struck by the front end of the vehicle. The hood of the present invention is hinged around two applied hinges at the rear of the hood. The hood is also disposed so that it picks up impacts in the vertical direction.

The hinge arrangement of the invention is such that the hinges are fixed in two rods connected at the hinges. One of the rods is a draw rod that receives forces in the longitudinal direction of the hood, and substantially stops the horizontal displacement of the hood in connection with a collision between the passenger car front and another object, such as a vehicle or a pedestrian. The second rod is a vertical rod arranged to deform at a vertical collision impact when hit by a predetermined vertical load. This rod is shaped so that it is able to receive the vertical load during a predetermined deformation length.

It should be observed that the term "vertical" used here in the description and patent claims should be given an interpretation broader than that normally related to this term. The term is used to describe an impact into the hood that comes from above. Hoods of different cars have different inclinations proportional to an absolute vertical plane. In a collision between a pedestrian and a passenger car front, the head of the person will hit the hood in a direction relative to the horizontal plane that is less than about 90°, and usually in a direction of about 50°.

BRIEF DESCRIPTION OF DRAWINGS

The invention will be described in the following with reference to an embodiment, as shown in the enclosed drawings, wherein.

DETAILED DESCRIPTION

Figure 1:
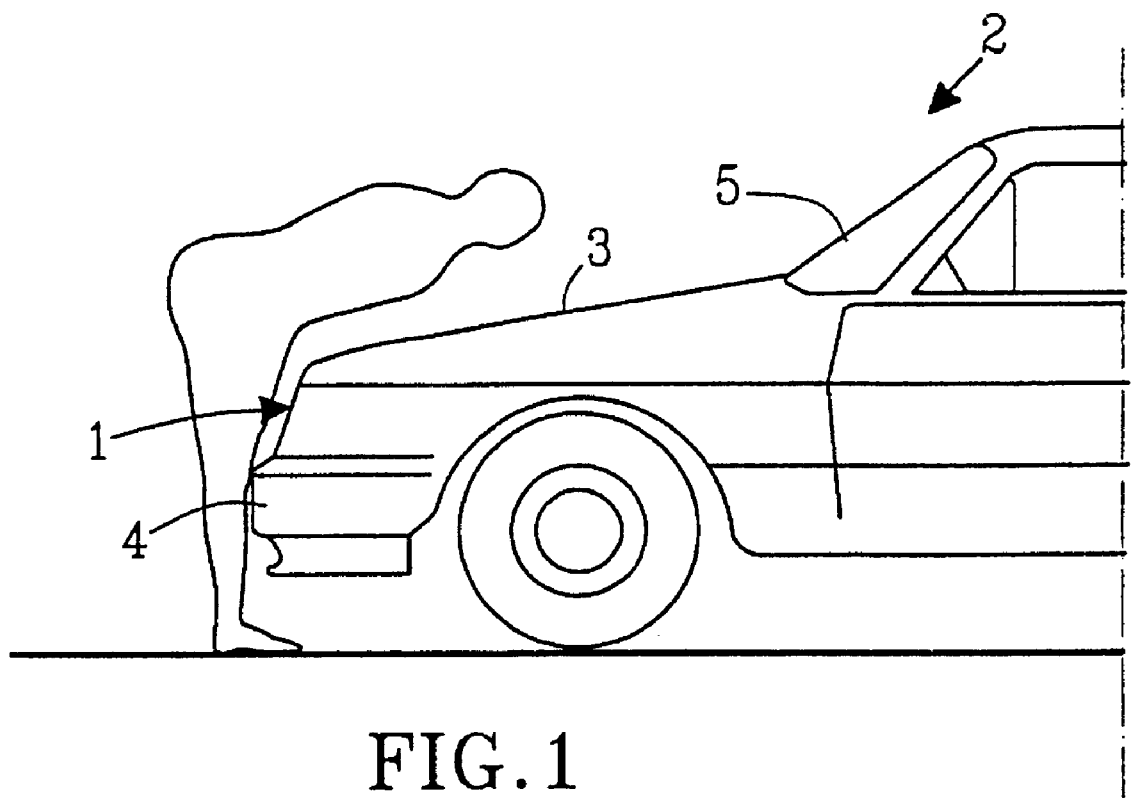
FIG. 1 is a schematic side view illustration of the front half of a passenger car in collision with a person.

FIG. 1 illustrates how a pedestrian hit by the front 1 of a passenger car 2 falls over the hood 3. The front bumper of the car is indicated by reference numeral 4, and the windshield with reference numeral 5.

Figure 2:
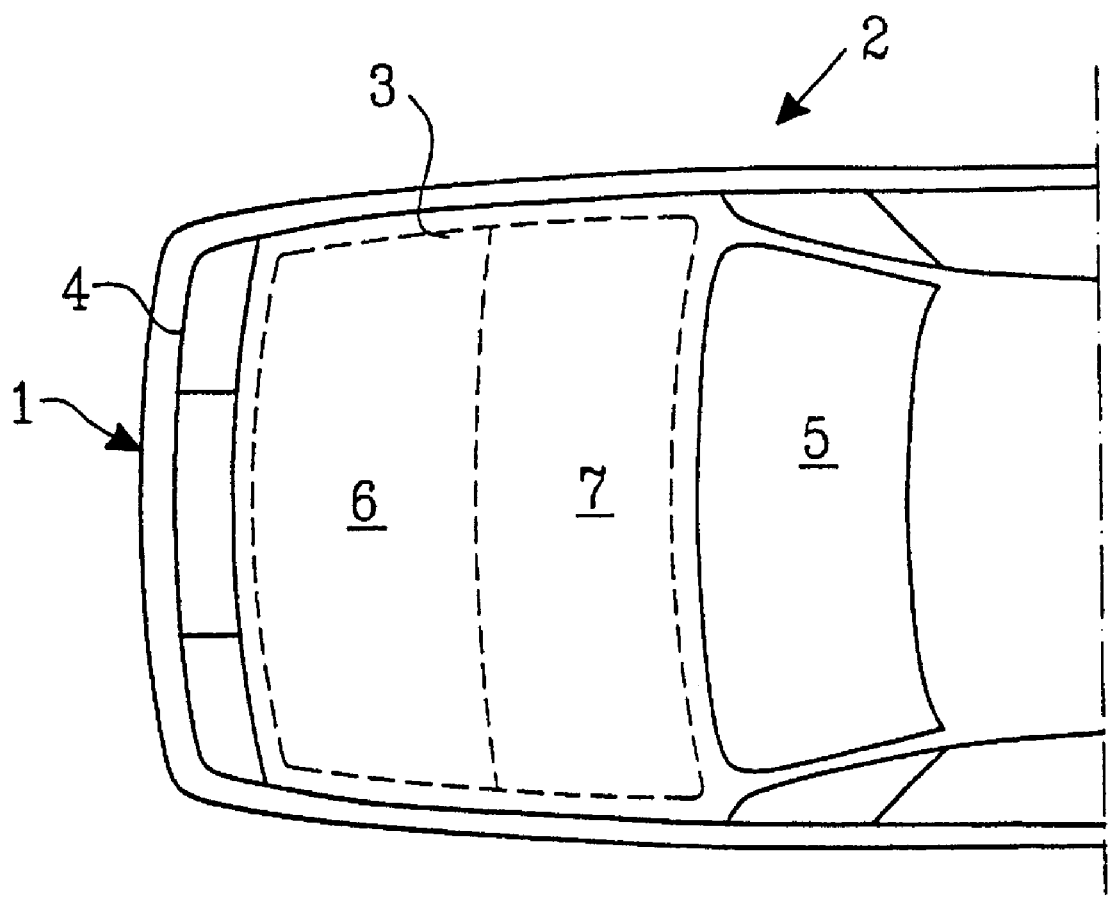
FIG. 2 is a schematic top view illustration of the front half of the car according to FIG. 1.

The most dangerous injuries for a pedestrian hit by a vehicle 2 are head injuries. These injuries can occur when the head of the person collides with the hood 3 at an oblique angle from above downwardly towards the hood 3. The place on the hood 3 where the person's head hits depends upon a variety of factors, such as where on the front of the vehicle the collision occurs, the front end construction of the car, and the height of the person. Referring to FIG. 2, accident investigations have shown that a child's head typically ends up in the area marked by dashed lines and reference numeral 6, while the head of an adult ends up more rearwardly, usually in the dashed line area indicated by reference numeral 7. The hood 3 itself is constructed so that it vertically deforms when it receives a predetermined vertical load that is less than a value at which serious head injuries may occur. There is provided enough deformation spaces under the hood 3 in those areas 6, 7 where there is a greater risk of being struck by a pedestrian's head in an accident. In most vehicles, the hood hinges are applied at the rear part of the hood 3 in the area 7 where the head of an adult pedestrian is most likely to strike.

Figure 3:
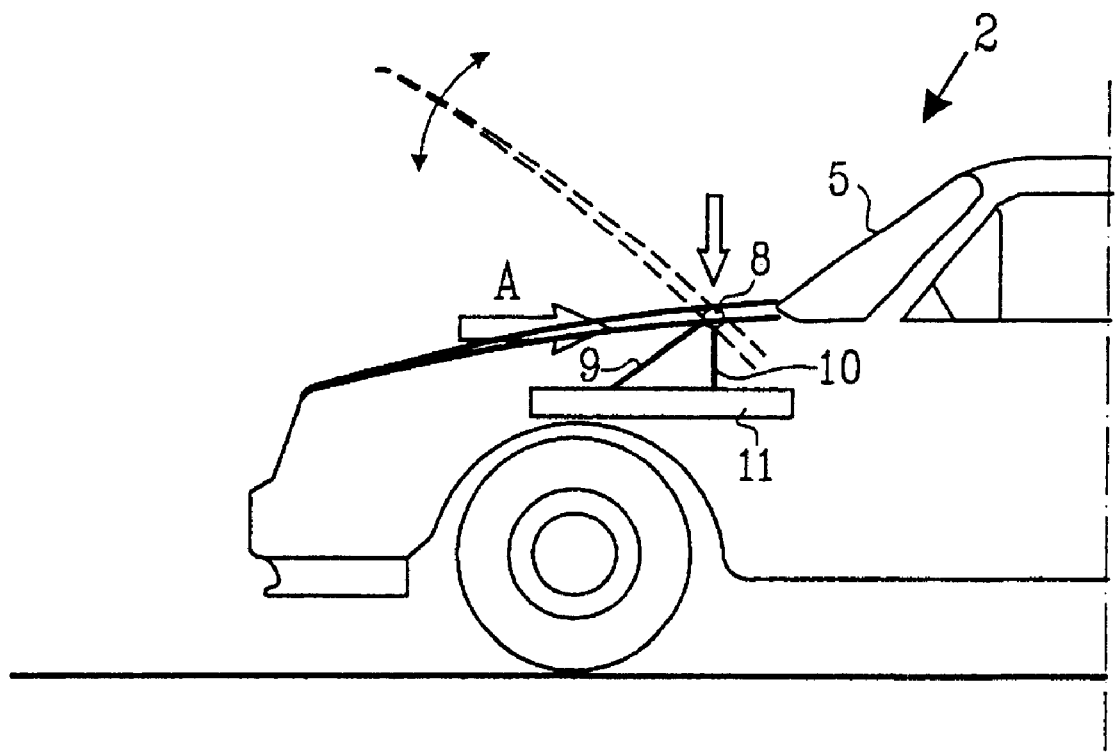
FIG. 3 schematically shows the principle of the solution according to the present invention.
Figure 4:
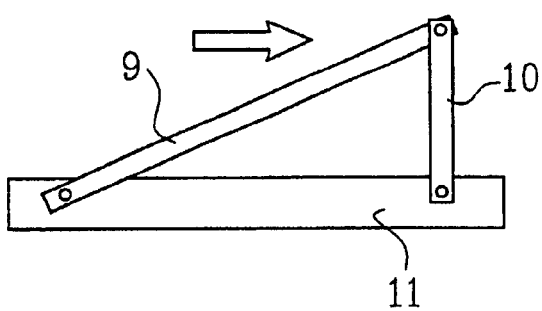
FIG. 4 is a side schematic view illustrating the hinge fixings of the present invention receiving a horizontal load.

Schematically illustrated in FIG. 3 is the front portion of a vehicle provided with the same reference numerals corresponding to those found in FIGS. 1 and 2. The hood 3 is suspended at each side by hinges 8. These hinges 8 are attached to a draw rod 9 and a vertical rod 10. The ends of the rods 9, 10 opposite the hinge 8 are attached to hard supporting body beams, denoted by reference numeral 11. The draw rod 9 is arranged so that it is able to receive high horizontal forces at the hood 3 without deforming, as illustrated in FIG. 4. It is important that the draw rod 9 stops the hood 3 from going through the windshield 5. The hood 3 is also shaped so that it has a sufficient deformation space to the underlying components. This can be difficult to achieve if the hood 3 that normally bends and curves differently in different places is not fixed in the longitudinal direction. This is true for the hinge supports that receive the rear part of the hood 3.

As seen from the drawing, the hinges 8 are supported in the vertical direction by the vertical rods 10. If the hood is displaced in the horizontal direction, there is no control over what vertical load the vertical rod 10 will deform, as well as the length of deformation distance between the hinge 8 and underlying hard body components.

Figure 5:
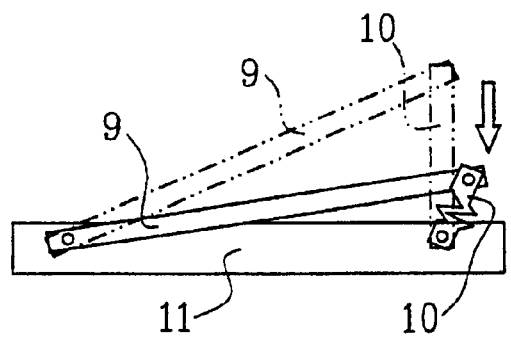
FIG. 5 is a side schematic view illustrating the hinge fixings according to FIG. 4 after deformation in association with a vertical load.

An object of the present invention is to decrease the risk for serious head injuries to pedestrians hit by the front of a vehicle should the head of the person end up on or in the near of the hinge fixings. The principle of the solution is illustrated in FIGS. 4 and 5. As shown, the draw rod 9 and vertical rod 10 are attached to a body beam 11. The draw rod 9 is provided to prevent horizontal displacement of the hood and thereby the hinge 8. The vertical rod 10 becomes permanently deformed at a vertical load of a predetermined size in its longitudinal direction, as illustrated in FIG. 5. Permanent deformation means that the vertical rod 10 is plastically deformed. This type of deformation occurs during substantially constant load, which is preferred for reducing the risk of head injuries. Deformation of the vertical rod 10 occurs at a vertical load so low that the force against a head falling down towards the hinge fixing is not so high that there is a risk that the person becomes seriously injured. The size of this predetermined vertical load depends on the available deformation space, i.e., the length of the vertical rod 10 as shown in the embodiment of FIGS. 4 and 5. The larger the available length between the hinge fixing before deformation and the underlying hard body beam, the smaller the value of the predetermined vertical load at which deformation of the vertical rod 10 occurs. The intent is to completely stop the deformation movement and absorb the kinetic energy before the hinge, and consequently the person's head, hits the hard body beam. Optimal effect is achieved when the vertical rod 10 deforms uniformly and receives the predetermined vertical load during the whole deformation length, i.e., the softer and longer the stop length, the less injuries will occur on the head of a struck pedestrian when the head collides with the hood at or near the hinges. The predetermined vertical load must also be adapted to other strength requirements. For instance, there should not be any risk for the vertical rod 10 in a front hinge joint to deform when a person jumps up and sits on the hood.

In constructing hinge arrangements according to the present invention, it is preferred that the risk of serious head injuries due to a pedestrian's head bumping the hood at or near the hinge fixings is reduced in accidents wherein the vehicle is moving at velocities up to 40 kilometers per hour (km/h). The available deformation length of the vertical rod 10 is preferably in the order of magnitude of at least about 50 to about 100 millimeters (mm), and most preferably exceeding about 70 mm. The predetermined vertical load is preferably in the order of magnitude of about one to about five kilo-Newtons (kN), and most preferably about 2 kN.

The vertical rod 10 is preferably uniformly deformed and receives the predetermined force evenly along its length. This even load reception may be achieved in various ways. For example, the vertical rod 10 can be provided with embossing along its length that are shaped so that the vertical rod 10 deforms planarly at a certain predetermined force. The even load reception can also be achieved by varying the thickness of the vertical rod 10 along its length, and/or supplying the inner portion of the rod 10 or edges thereof with cavities.

Figure 6:
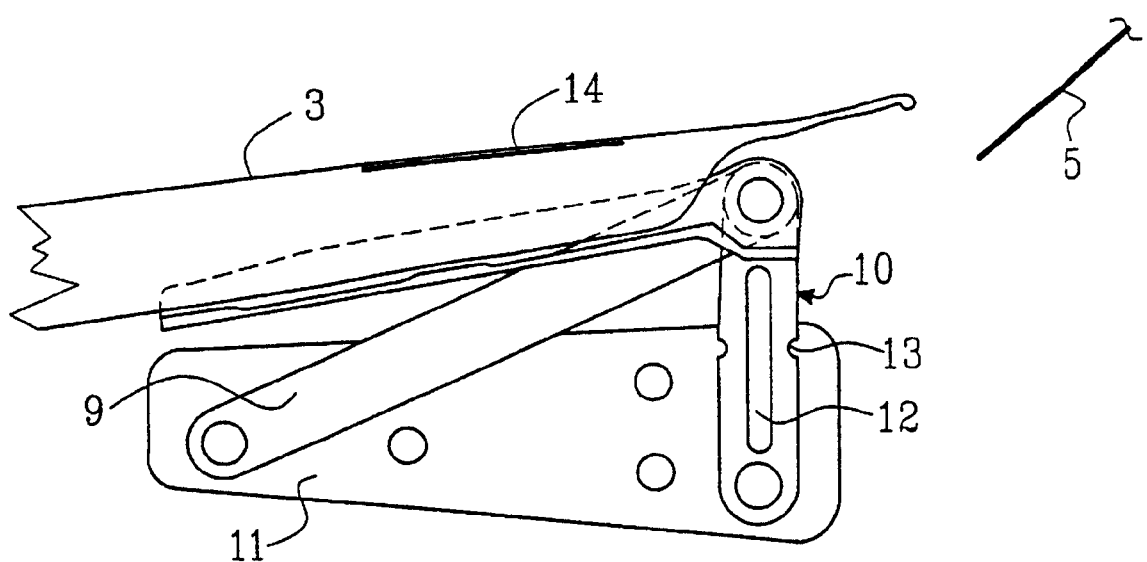
FIG. 6 shows a side view of an embodiment of a device according to the present invention.

Referring to FIG. 6, an embodiment of a hinge fixing is shown. The vertical rod 10 is straight and elongated. The rod 10 is further provided with a longitudinal cavity 12 and two waist cavities 13. When deformed, the vertical rods 10 bend outwardly at the cavities 13. The hood 3, windshield 5 and draw rod 9 are also shown in FIG. 6. The main impact area 14 is that area that gives rise to deformation of the vertical rod 10. Any extension of this area depends on the actual case load at different collisions.

The vertical rod 10 illustrated in the Figures may be shaped in many different ways, curved or angled. What is critical is that the vertical rod receives the same load over substantially all its entire deformation length. Accordingly, a spring would be unsuitable as a vertical rod.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A hinge arrangement for passenger car hoods for decreasing injuries to pedestrians, the hinge arrangement comprising:

a hood pivotable between a closed position and an open position around at least two hinges applied at the rear end of the hood, said hood being arranged in said closed position to compliantly receive impacts in the vertical direction;

each hinge being fixed with at least two rods connected to said hinge;

wherein at least one of said rods is a draw rod arranged to receive forces in the longitudinal direction of said hood and substantially stop a horizontal displacement of the hood in connection with a collision between the passenger car front and another object; and wherein when the hood is in said closed position, at least one of the rods is a vertical rod arranged to permanently deform at a vertical collision impact while receiving a predetermined vertical load, said vertical rod being shaped to receive said vertical load over a predetermined deformation length.

2. The device according to claim 1 wherein the vertical rod is comprised of an elongated element shaped to deform in its longitudinal direction at said vertical load.

3. The device according to claim 1 wherein the deformation length is in the magnitude of at least about 50 to about 100 mm.

4. A device according to claim 3 wherein the deformation length is in the magnitude exceeding about 70 mm.

5. The device according to claim 1 wherein the predetermined vertical load is in the range of about one to about five kilo Newtons.

6. The device according to claim 5 wherein the predetermined vertical load is about 2 kilo Newtons.

7. The hinge arrangement according to claim 1, said vertical rod further comprising a longitudinal cavity and two waist cavities.

\* \* \* \* \*